UNITED STATES PATENT OFFICE.

OSCAR TROPLOWITZ, OF HAMBURG, GERMANY.

PREPARING TOPICAL REMEDIES.

SPECIFICATION forming part of Letters Patent No. 527,906, dated October 23, 1894.

Application filed August 17, 1894. Serial No. 520,600. (No specimens.)

*To all whom it may concern:*

Be it known that I, OSCAR TROPLOWITZ, a subject of the Emperor of Germany, residing at Hamburg, Germany, have invented a new and Improved Process for Making Dry Unguents, of which the following is a specification.

In carrying out my invention, cold creamed milk diluted in ten times its weight of distilled water is treated with acetic acid, and the ordinary precipitate of caseine, is made free of salts and acids by washing the same with distilled water and free of fat by means of benzine. Of the caseine, which is triturated after drying, five hundred parts are dissolved in a mixture of two hundred and fifty parts liquid caustic ammonia of a specific weight of 0.910, two hundred and fifty parts of glycerine and five thousand parts distilled water, and it is boiled until the complete evaporation of the ammonia. The remaining quantity after boiling is about two thousand five hundred parts. Borax can be used for dissolving the caseine. The viscid product remaining after the boiling yields unguentous emulsions with every kind of fat, which have the property of forming a drying, flexible and cooling cover upon the skin in a few minutes. Such an unguent can for instance be obtained by making an emulsion of six hundred parts of the fluid obtained by the above described process with two hundred parts of vaseline. This product is a perfectly homogeneous unguent in which fat is divided as finely as possible. It leaves a dry, flexible layer upon the skin which contains fifty per cent. fat.

This unguent can be mixed with medicinal substances of vegetable or chemical origin, but not with acids, and is principally made for medicinal purposes.

What I claim is—

The process of preparing dry unguents consisting in dissolving caseine in a mixture of liquid caustic ammonia, glycerine and distilled water, boiling the same and mixing as an emulsion the product with a fat, substantially as described.

In witness whereof I have hereunto set my hand in presence of two witnesses.

OSCAR TROPLOWITZ.

Witnesses:
ALFRED JOSEPH,
HERMANN REISS.